United States Patent
Aledi et al.

(10) Patent No.: US 10,596,777 B2
(45) Date of Patent: Mar. 24, 2020

(54) HONEYCOMB SANDWICH PANEL

(71) Applicant: IMBALLAGGI PROTETTIVI S.R.L., Novara (IT)

(72) Inventors: Alessandro Aledi, Masalengo-Lodi (IT); Marco Boltri, Masalengo-Lodi (IT)

(\*) Notice: Subject to any disclaimer, the term of this patent is extended or adjusted under 35 U.S.C. 154(b) by 0 days.

(21) Appl. No.: 14/914,606

(22) PCT Filed: Jun. 9, 2015

(86) PCT No.: PCT/EP2015/001155
§ 371 (c)(1),
(2) Date: Feb. 25, 2016

(87) PCT Pub. No.: WO2015/192948
PCT Pub. Date: Dec. 23, 2015

(65) Prior Publication Data
US 2017/0087797 A1    Mar. 30, 2017

(30) Foreign Application Priority Data
Jun. 19, 2014    (IT) ................. MI2014A1110

(51) Int. Cl.
*E04B 1/00*    (2006.01)
*B32B 3/12*    (2006.01)
(Continued)

(52) U.S. Cl.
CPC .................. *B32B 3/12* (2013.01); *B32B 3/28* (2013.01); *B32B 5/02* (2013.01); *B32B 27/08* (2013.01);
(Continued)

(58) Field of Classification Search
CPC .. B32B 3/12; B32B 27/08; B32B 5/02; B32B 27/12; B32B 27/32; B32B 2250/05;
(Continued)

(56) References Cited

U.S. PATENT DOCUMENTS

2009/0252920 A1\* 10/2009 Khan ................. B32B 3/12
428/116
2010/0173126 A1\* 7/2010 Malek ................. B32B 15/08
428/138
(Continued)

FOREIGN PATENT DOCUMENTS

DE    102012006609 A1    10/2013
EP    1714772 A1    10/2006
(Continued)

*Primary Examiner* — Basil S Katcheves
(74) *Attorney, Agent, or Firm* — Themis Law

(57) ABSTRACT

A honeycomb sandwich sheet or panel, based on thermoplastic polypropylene, includes a structure having two flat outer films, thermowelded to a central film that includes a thermoformed blister film, with blisters repeated in a regular and continuous pattern, the flat outer films including a coextruded two-layer film, based on thermoplastic polypropylene, wherein the inner layer faces the central thermoformed film, and the central thermoformed blister film includes a coextruded three-layer film, based on thermoplastic polypropylene, wherein the two outer layers face the flat outer films, and wherein the structure includes and additional layer C thermowelded to the outer layer of the two flat outer films.

13 Claims, 3 Drawing Sheets

Figure 1:
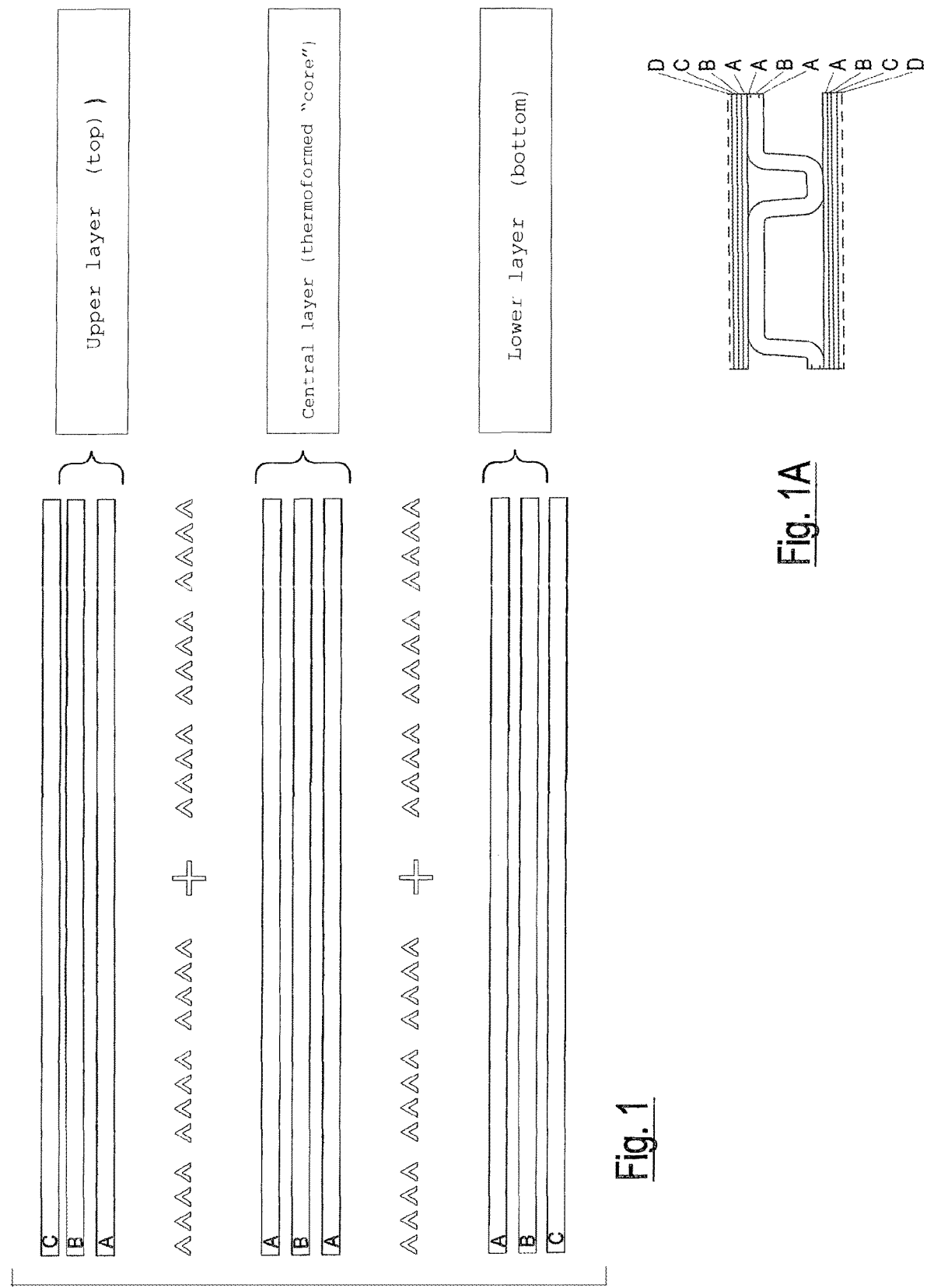

(51) Int. Cl.
  *B32B 5/02*    (2006.01)
  *B32B 27/12*   (2006.01)
  *B32B 27/32*   (2006.01)
  *B32B 27/08*   (2006.01)
  *B32B 3/28*    (2006.01)
  *B32B 27/20*   (2006.01)
  *B60N 2/64*    (2006.01)
  *E04C 2/26*    (2006.01)
  *E04C 2/34*    (2006.01)

(52) U.S. Cl.
  CPC .............. *B32B 27/12* (2013.01); *B32B 27/20* (2013.01); *B32B 27/32* (2013.01); *B60N 2/64* (2013.01); *E04C 2/26* (2013.01); *E04C 2/3405* (2013.01); *B32B 2250/05* (2013.01); *B32B 2250/40* (2013.01); *B32B 2262/0253* (2013.01); *B32B 2262/0261* (2013.01); *B32B 2262/0276* (2013.01); *B32B 2262/101* (2013.01); *B32B 2264/104* (2013.01); *B32B 2305/024* (2013.01); *B32B 2307/558* (2013.01); *B32B 2307/718* (2013.01); *B32B 2323/10* (2013.01); *B32B 2451/00* (2013.01); *B32B 2605/00* (2013.01); *B32B 2605/003* (2013.01); *B32B 2607/00* (2013.01); *E04C 2002/3472* (2013.01)

(58) Field of Classification Search
  CPC .......... B32B 2250/40; B32B 2305/024; B32B 2262/101; B32B 2262/0276; B32B 2307/718; B60N 2/64; E04C 2/26; E04C 2/3405
  USPC ....................................... 52/745.13; 428/116
  See application file for complete search history.

(56) References Cited

U.S. PATENT DOCUMENTS

| | | | |
|---|---|---|---|
| 2011/0045724 A1* | 2/2011 | Bahukudumbi | B32B 5/26 442/57 |
| 2011/0086208 A1* | 4/2011 | Nemphos, Jr. | B32B 5/26 428/196 |
| 2011/0281063 A1* | 11/2011 | Levit | B32B 3/12 428/116 |
| 2015/0050446 A1 | 2/2015 | Stamp et al. | |

FOREIGN PATENT DOCUMENTS

| | | |
|---|---|---|
| EP | 2025505 A1 | 2/2009 |
| IT | MI20081317 A1 | 1/2010 |
| WO | WO2005105436 A1 | 11/2005 |
| WO | WO2014033725 A1 | 3/2014 |

* cited by examiner

Fig. 2
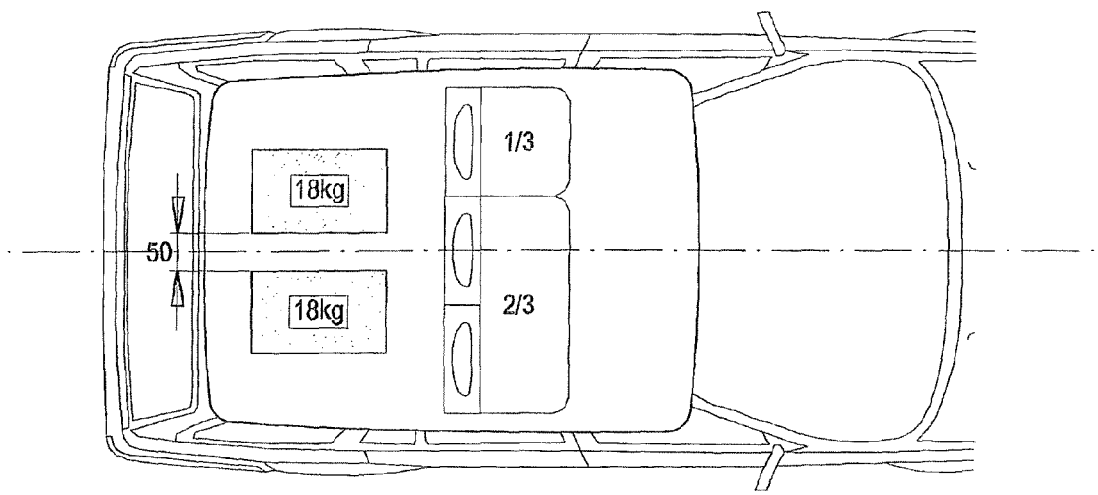
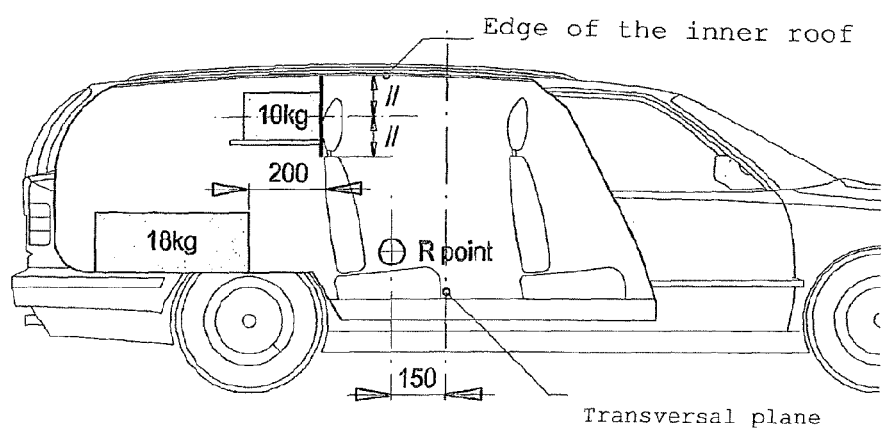
Fig. 3

HONEYCOMB SANDWICH PANEL

The present invention relates to a honeycomb sandwich sheet or panel, based on thermoplastic polypropylene.

The present invention derives from the field of thermoplastic sheets destined for all applications in which characteristics of resistance and lightness are fundamental, as in the case of panels or sheets for automotive interiors; or sheets or panels to be used in the furnishing field or building industry, or sandwich sheets or panels applied in products which require intrinsic characteristics such as lightness, shock-resistance, resistance to high temperatures, energy absorption during impact, together with other features such as simplicity and processing versatility (thermoforming, die cutting, upholstering, etc.) and recyclability.

In industrial fields which require this type of product, in particular in the field of automotive interiors, rigid honeycomb supports made of polypropylene to be used mainly as components defined as "rear seatback panels for rear seats", do not exist. These products must be capable of satisfying the necessary requirements of lightness, resistance and safety without envisaging layers of sheet-metal and, with respect to the state of the art, are not injection-moulded panels or panels moulded with a rotation system. Products to be used in automotive interiors and especially as "rear seatback panels for rear seats" are known and commercialized, which can at least partly guarantee the same performances as rigid honeycomb supports. These products, however, resort to the use of heterogeneous materials, which are heavy and require complex processing, with much higher costs for both equipment and systems. Furthermore, with the use of these materials, there is a loss of lightness, and also manageability in the use of these panels, in addition to total or partial recyclability.

In the field of automotive interiors and, in particular, in the field of components defined as "rear seatback panels for rear seats", the following supports are used:

Sheet-metal Panel: this is a panel produced by means of a forming process of the sheet with extremely high investment costs: cost of the mould and caseback, high management costs and times of the production start-up modifications, cataphoresis painting costs, in addition to the necessity of including an aesthetic coating phase of the structure once it has been assembled on the vehicle;

Injection-moulded Panel: this is a panel produced by means of an injection-moulding process, therefore by melting a plastic material, which is then injected into a mould; high thicknesses and consequently high weights are indispensable for allowing the flow of the material and guaranteeing the rigidity of the panel. The costs for the preparation of the mould are also extremely high;

Panel moulded with a rotation system: this is a panel obtained by means of an extremely lengthy and complex transformation process with various passages; extremely high costs linked to the number of passages and consequently to the various elements of the system (there is not a single mould), extremely lengthy process time and processing of small quantities. The assembly is also particularly complex as, once the structure has been fixed, the aesthetic coating of the same must be effected.

The three types of panel described above also require, once produced, an upholstering step.

The necessity is therefore particularly felt in the field for finding materials that have characteristics of particular lightness and, at the same time, resistance, safety and recyclability, with reduced production and installation costs.

The objective of the present invention is therefore to provide a sandwich sheet or panel made of thermoplastic material, which overcomes the drawbacks of the known art.

More specifically, the objective of the present invention is to provide a honeycomb sandwich sheet or panel, based on thermoplastic polypropylene, composed of two outer films (or sides), joined to a central film (or core) consisting of a thermoformed blister film having a cylindrical form or other forms (honeycomb structure) repeated in a regular and continuous pattern, wherein the particular conformation of the central film confers mechanical properties, load resistance and functional characteristics to the sheet; said sheet having specific structural characteristics which avoid the use of heavy composite materials such as sheet-metal, iron, wood, which are often not safe.

The objective of the present invention is therefore to provide a honeycomb sandwich sheet or panel, based on thermoplastic polypropylene, which has optimum mechanical and safety characteristics, also with particularly reduced thicknesses/weights.

An object of the present invention therefore relates to a honeycomb sandwich sheet or panel, based on thermoplastic polypropylene, comprising a structure consisting of two flat outer films, thermowelded to a central film, consisting of a thermoformed blister film, with blisters repeated in a regular and continuous pattern, said flat outer films consisting of a coextruded two-layer film (AB), based on thermoplastic polypropylene, wherein the inner layer (A) faces the central thermoformed film, and the central thermoformed blister film consists of a coextruded three-layer film (ABA) based on thermoplastic polypropylene, wherein the two outer layers (A) face the flat outer films, wherein said structure comprises a further layer C, thermowelded to the outer layer B of the two flat outer films.

Said layer C consists of a continuous filament fiber network or technical fabric, said network or technical fabric comprising or substantially consisting of polyethylene terephthalate (PET), polypropylene, polyamide, glass fiber or other polyolefins, and/or relative mixtures. Said network or fabric preferably has a grammage ranging from 50 to 300 g/m$^2$.

The layer C can also consist of a pre-coupled structure which comprises the network or technical fabric described above and an aesthetic fabric, wherein the network or technical fabric is in contact with the outer layer B of the two flat outer films.

A further object of the present invention also relates to a process for producing the honeycomb sandwich sheet or panel, made of thermoplastic material, wherein the following steps are carried out in a single phase:

thermowelding two flat outer layers consisting of a coextruded two-layer film (AB), based on thermoplastic polypropylene, wherein the inner layer (A) faces the central thermoformed film, with a central thermoformed blister film consisting of a coextruded three-layer film (ABA) based on thermoplastic polypropylene, wherein the two outer layers (A) face the flat outer films, and thermowelding, on the outer layer B of the two flat outer films, two further layers C, consisting of a continuous filament network or technical fabric comprising polyethylene-terephthalate (PET), polypropylene, polyamide or fiber glass, possibly pre-coupled with an aesthetic finishing fabric which can be needled, TNT, dilour.

The main advantage of the sheet or panel according to the present invention is that, by means of a single process, the two layers C, i.e. the continuous filament networks or technical fabrics, and possibly the aesthetic fabrics are coupled online by means of a thermo-mechanical welding process, without the use of glues/adhesives.

In the description of the present invention, the term "film" refers to a film that can consist either of only one layer or at least two layers having a different or the same composition.

The thermoplastic material based on polypropylene is preferably polypropylene comprising talc and/or glass fiber and/or polyamide.

In particular, the honeycomb sandwich sheet or panel according to the present invention envisages the following structure C/BA/ABA/AB/C containing in order: Layer C thermowelded to the layer B of the top film

| Flat coextruded outer film (BA) | Layer B | Top |
| | Layer A | film |
| Coextruded central film (ABA) | Layer A | |
| | Layer B | |
| | Layer A | |
| Flat coextruded outer film (AB) | Layer A | Bottom |
| | Layer B | film |

Layer C thermowelded to layer B of the bottom film whose structure BA/ABA/AB is also represented in FIG. 1.

FIG. 1A illustrates a cross-section of a honeycomb sandwich panel according to the invention, in which a honeycomb core (ABA) is disposed between upper and lower skins (ABC), with an optional aesthetic finishing fabric (D) also shown. A more detailed description of the constituent elements of the panel shown in FIG. 1A is provided hereinafter.

More specifically, the flat outer film is a coextruded two-layer film, having a structure AB, composed of an inner layer (A) and an outer layer (B), wherein the inner layer (A) is extruded from an extrusion mixture comprising
  from 0.00% to 100% of polypropylene binder, having a melt flow index at 230° C.-2.16 kg ranging from 3 to 6 g/10 min; and
  from 0.00% to 100.00% by weight of polypropylene copolymer, having a melt flow index at 230° C.-2.16 kg ranging from 3 to 8 g/10 min,
the weight percentages being indicated with respect to the total weight of the extrusion mixture of the layer A; and wherein the outer layer (B) is extruded from an extrusion mixture comprising
  from 0.5% to 50%, preferably from 0.5% to 30%, by weight of polypropylene copolymer, having a melt flow index at 230° C.-2.16 kg ranging from 3 to 8 g/10 min;
  from 10% to 70%, preferably from 10% to 40%, by weight of polypropylene homopolymer, having a melt flow index at 230° C.-2.16 kg ranging from 2 to 6 g/10 min;
  from 0.5% to 60% by weight of a master mixture (preferably 40% by weight) comprising a stiffening agent which comprises from 30% to 60% of calcium carbonate and micronized talc, and from 70% to 40% by weight of polypropylene homopolymer;
  from 0.5% to 2% of a master mixture comprising a colouring agent, preferably consisting of carbon black, in a percentage ranging from 50% to 80% by weight, the complement to 100 of the master mixture consisting of polyolefins,
the weight percentages being indicated with respect to the total weight of the extrusion mixture of the layer B.

In the present description, polypropylene binder refers to a polymer having a low melting point (terpolymer) and polypropylene copolymer refers to all macromolecules whose polymeric chain contains repetitive units of two or more different species, specifically of propylene and other olefins.

The central film, consisting of a thermoformed blister film, having a cylindrical, conical, pyramidal form or other geometrical forms, preferably cylindrical, repeated in a regular and continuous pattern, is a coextruded three-layer film, having a structure ABA, composed of an inner layer (B) and two outer layers (A), wherein the outer layer (A) is extruded from an extrusion mixture comprising
  from 0.00% to 100% of polypropylene binder, having a melt flow index at 230° C.-2.16 kg ranging from 3 to 6 g/10 min; and
  from 0.00% to 100.00% by weight of polypropylene copolymer, having a melt flow index at 230° C.-2.16 kg ranging from 3 to 8 g/10 min,
the weight percentages being indicated with respect to the total weight of the extrusion mixture of the layer A; and wherein the inner layer (B) is extruded from an extrusion mixture comprising
  from 0.5% to 50%, preferably from 0.5% to 30%, by weight of polypropylene copolymer, having a melt flow index at 230° C.-2.16 kg ranging from 3 to 8 g/10 min;
  from 10% to 70%, preferably from 10% to 40%, by weight of polypropylene homopolymer, having a melt flow index at 230° C.-2.16 kg ranging from 2 to 6 g/10 min;
  from 0.5% to 60% by weight of a master mixture (preferably 40% by weight) comprising a stiffening agent which comprises from 30% to 60% of calcium carbonate and micronized talc, and from 70% to 40% by weight of polypropylene homopolymer;
  from 0.5% to 2% of a master mixture comprising a colouring agent, preferably consisting of carbon black, in a percentage ranging from 50% to 80% by weight, the complement to 100 of the master mixture consisting of polyolefins.

The layers A and B of the top/bottom film and central film can have the same composition or a different composition.

The layer C consists of a continuous filament fiber network or technical fabric, said network or technical fabric comprising, or substantially consisting of, polyethylene terephthalate (PET), polypropylene, polyamide, glass fiber or other polyolefins, and/or relative mixtures.

Said network or fabric preferably has a grammage ranging from 50 to 300 g/m$^2$.

Alternatively, the layer C can envisage a pre-coupled structure consisting of said continuous filament network/technical fabric as described above and an aesthetic finishing fabric, which can be needled, TNT, dilour.

The sheet or panel according to the present invention has a weight ranging from 300 g/m$^2$ to 4,500 g/m$^2$, preferably from 400 g/m$^2$ to 2,000 g/m$^2$.

The sheet or panel according to the present invention has a thickness ranging from 2.00 to 15.0 mm, preferably from 2.00 to 10.00 mm.

The blisters present in the central thermoformed layer have a diameter ranging from 3.00 to 18.00 mm, preferably from 3.50 to 12 mm and the height of the protrusions/blisters is variable and depends on the diameter of the same, for example the height being 3.00 mm for a diameter of 3.5 mm and 5.00 mm for a diameter of 8.00 mm.

The layers A and B can have the same or a different thickness and said thickness ranges from 80 microns to 1.15 mm.

A further object of the present invention relates to the use of the honeycomb sandwich sheet or panel, based on thermoplastic polypropylene, as a structural panel in the building industry and as an aesthetic panel in the furnishing industry and for automotive interiors.

The panel that envisages only technical fabric as layer C can be used directly as a structural panel in the building industry. The continuous filament technical fabric, which forms layer C, behaves like a network capable of absorbing impact, avoiding breakages and the scattering of material (safety).

For uses in the furnishing industry and for automotive interiors, on the other hand, the production of an "aesthetic" sheet or panel, i.e. a sheet or panel ready for use without the necessity of further aesthetic finishing treatment, is of particular interest.

In this case, as already mentioned, the technical fabric which forms layer C is pre-coupled with aesthetic fabrics such as needled fabrics, TNT (unwoven fabrics), dilour and all possible aesthetic fabrics requested in the field and by the final user: in this way, the triple coupling (PP+Mesh technical fabric+aesthetic fabric) is simplified and facilitated during the production of the mother sheet of the panel.

More specifically, the continuous filament technical fabric is obtained by means of a spinning process, film formation, needling, thermosetting, resin coating and curing.

The process according to the present invention has definite advantages: the coupling with the layer C, in fact, is effected online during the extrusion of the mother sheet, it takes place by means of heat and not with the use of glues and the complete panel is obtained in a single step (with energy saving, a saving of time and processing costs, a saving of manpower), which, in the case of application in the field of automotive interiors, must only be subjected to two further steps to allow it to be ready for the vehicle: thermoforming and assembly on the vehicle.

Three production steps are therefore sufficient: the production of the sheet, thermoforming and transportation to the company's final assembly centre to close the cycle. All of this allows an enormous reduction in costs and consequently a saving in the car production industry.

Further advantages of the sheet or panel according to the present invention are the following: if the panel has also already been coated with the aesthetic film/fabric, it does not require upholstering: it is necessary and sufficient to position it inside the structure for which it is destined, without the need for effecting an aesthetic coating after fixing, with a consequent reduction in assembly times and costs, with reduced variable costs, with a reduction in the number of operations. The aesthetic fabric/technical fabric pre-coupling and the production of the end-product already aesthetically coated, also allow a transformation in the end-product with a specific finishing which is obtained with a male/female thermoforming mould. Said panel can also be upholstered by the insertion of profiles sewn directly onto the panel, more specifically, profiles for fixing the aesthetic finishing fabric onto the seat structure.

Furthermore, thanks to the presence of the aesthetic fabric, the sheet or panel according to the present invention can be subjected directly to sewing operations, by applying, for example, zips, finishing edges and all that may be necessary.

The subsequent transformation of the panel or sheet according to the present invention is particularly simple as it can be effected through a thermoforming step with specific planes using vertical presses, coupled with an infrared lamp oven (heating). The plant consists of a steel mould complete with blades, produced with numerical control of the mathematics of the element to be formed. This process comprises forming and cutting the sheet or panel according to the present invention in a single step, with delivery of the end-product.

Further advantages of the sheet or panel according to the present invention are its lightness (with a consequent reduction in transportation costs), transformation simplicity with reduced costs for the use of machinery and simple equipment, recyclability, recovery of recycled material, substitution of composite, heavy and, in some cases, unsafe materials, such as sheet metal, iron and wood, shock resistance and resistance to high temperatures, versatility of use and high safety: the material, in fact, which is light and resistant at the same time, absorbs energy during impact and does not break up creating dangerous chips or splinters for people and the container (safety).

The sandwich sheet or panel according to the present invention is produced for example by means of the process described in patent EP1638770, suitably modified for envisaging the contemporaneous thermowelding of the layer C.

Other characteristics and advantages of the invention will appear evident from the following examples provided for illustrative and non-limiting purposes.

EXAMPLE 1

Sheet with a weight of 1500 g/m$^2$
Diameter of blister: d8 mm
Composition of outer films (top and bottom):
Layer B:
24.5% PP copolymer (melt flow index=4 g/10 min);
30% PP homopolymer (melt flow index=3 g/10 min);
45% master mixture comprising 60% of calcium carbonate and 40% of PP homopolymer;
0.5% master mixture comprising 40% of titanium dioxide.
Layer A:
70% PP binder (melt flow index=5 g/10 min);
30% PP copolymer (melt flow index=4 g/10 min);
The central film envisages layers A and B having the same composition as the top and bottom films indicated above.
Weight distribution of the films:
Top film/central film/bottom film=40/20/40%
Composition of layer C:
a continuous filament technical fabric based on PET was used, having a grammage of 250 g (for example).
The panel obtained has a total weight equal to 0.780 kg/m$^2$.

It has a weight reduction equal to 60% approximately with respect to materials of the state of the art available on the market, as can be seen from the following comparative table, in which there is a comparison of rear seatback panels for rear seats produced in different materials:

| Product | Tot/kg |
| --- | --- |
| Panel Example 1 | 0.780 kg |
| Plastic panel injection moulded | 1.01274168 kg |
| Sheet-metal panel | 1.870593456 kg |
| Plastic panel roto-moulded | 3.260521436 kg |

The sheet thus obtained was subjected to two different tests for testing its shock resistance and safety when used as "rear seatback panel for rear seats".
Test 1
ECE Safety Centre Test The panel obtained according to Example 1 was tested as a "rear seatback panel for rear seats" to verify its efficiency in protecting the occupants of the vehicle from displacements/movements of luggage.

A test was effected according to what is provided on pages 54-59 of Annex 9 of Regulation n°17 (Uniform provisions concerning the approval of vehicles with regard to the seats, their anchorages and any head restraints) of the Agreement "Agreement concerning the adoption of uniform technical prescriptions for wheeled vehicles, equipment and parts which can be fitted and/or be used on wheeled vehicles and the conditions for reciprocal recognition" of approvals granted on the basis of these prescriptions" (E/ECE/324 E/ECE/TRANS/505 (REV.1/ADD.16/REV.4) of Jul. 31, 2002.

In particular, as provided by this regulation, the efficiency of the panel obtained according to Example 1 was tested as a "rear seatback panel for rear seats", in which the test blocks were positioned as indicated in FIG. 2 and in FIG. 3, with the following results:
panel according to the invention: resisted impact and did not break;
sheet metal panel: was deformed;
injection plastic panel: broke, as it is extremely rigid and therefore not suitable for absorbing energy;
plastic panel obtained by retromoulding: broke in the fixing areas, as it is extremely rigid and therefore not suitable for absorbing energy.
Test 2

The panel obtained according to Example 1 was tested to verify its resistance and safety by means of the "Drop Test Chrysler at −29° n° chap. PF-12146". (pages 20-21 Change A: 2011-10-31).

More specifically, a test sample having dimensions of 345 mm×345 mm was tested as provided in the last line of Table 11 on page 21 which describes the dynamic test for thermoplastic materials.

Figure 4:
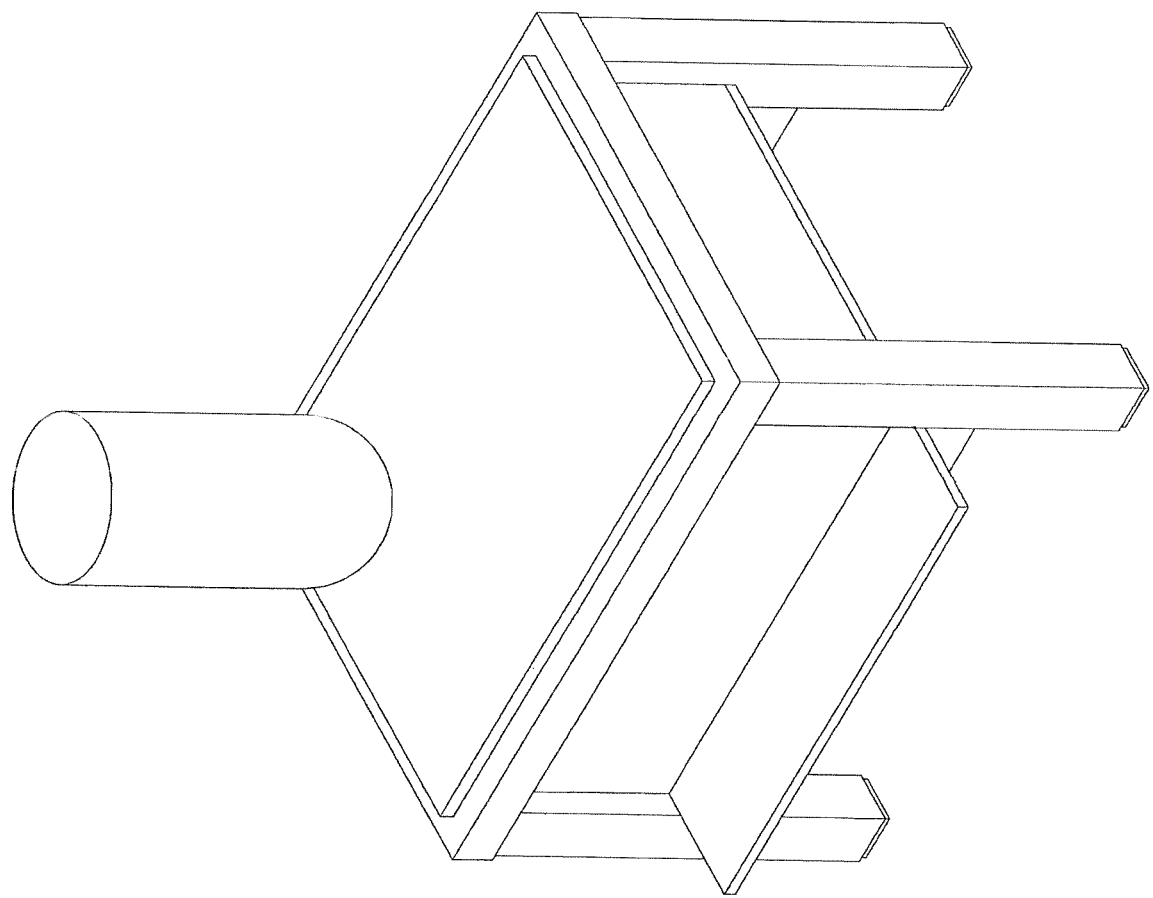

As shown in FIG. 4, a load of 20 kg was used, consisting of a cylinder having a diameter of 102 mm, which was dropped in two different points of the test sample from a height of over 200 mm, at a temperature of 60° C. and at a temperature of −29° C.:
in both points and at both temperatures, the test sample sustained the impact, showing a slight deformation of the surface in contact with the cylinder.

The sound of a fracture in the inner blister structure was perceived.

The whole test was repeated twice, obtaining the same result. More specifically, no structural breakage or loss of functioning was observed.

The invention claimed is:

1. A honeycomb sandwich panel comprising:
   a structure having two flat outer films, thermowelded to a central film consisting of a thermoformed blister film, with blisters repeated in a regular and continuous pattern, each of said flat outer films consisting of a coextruded two-layer film made from thermoplastic polypropylene, said two flat outer films being an upper flat outer film (BA) and a lower flat outer film (AB), wherein an inner layer (A) of the two-layer film faces the central thermoformed blister film and the central thermoformed blister film is a coextruded three-layer film (ABA) made from thermoplastic polypropylene and an outer layer (B) of the two-layer film faces outwardly,
   wherein at least one of said upper flat outer film (BA) and a lower flat outer film (AB) has the inner layer extruded from an extrusion mixture comprising,
      from 0.00% to 100% by weight of a polypropylene binder having a melt flow index at 230°-2.16 kg ranging from 3 to 6 g/10 min,
      from 100% to 0% by weight of a first polypropylene copolymer having a melt flow index at 230° C.-2.16 kg ranging from 3 to 8 g/10 min, in a quantity equal to a difference between 100% and a quantity of the polypropylene binder, and the outer layer extruded from an extrusion mixture comprising,
      from 0.5% to 50% by weight of a second polypropylene copolymer having a melt flow index at 230° C.-2.16 kg ranging from 3 to 8 g/10 min,
      from 10% to 70% by weight of a first polypropylene homopolymer having a melt flow index at 230° C.-2.16 kg ranging from 2 to 6 g/10 min, and
      from 0.5% to 60% by weight of a master mixture comprising a stiffening agent which comprises from 30% to 60% of calcium carbonate and micronized talc, and from 70% to 40% by weight of second polypropylene homopolymer,
   wherein two outer layers (A) of the coextruded three-layer film (ABA) each face one of the flat outer films and an inner layer (B) of the coextruded three-layer film (ABA) is disposed therebetween,
   wherein the two outer layers of the coextruded three-layer film (ABA) are extruded from an extrusion mixture comprising,
      from 0.00% to 100% by weight of a polypropylene binder having a melt flow index at 230°-2.16 kg ranging from 3 to 6 g/10 min,
      from 100% to 0% by weight of a first polypropylene copolymer having a melt flow index at 230° C.-2.16 kg ranging from 3 to 8 g/10 min, in the quantity equal to the difference between 100% and the quantity of the polypropylene binder,
   and the inner layer of the coextruded three-layer film (ABA) is extruded from an extrusion mixture comprising,
      from 0.5% to 50% by weight of a second polypropylene copolymer having a melt flow index at 230° C.-2.16 kg ranging from 3 to 8 g/10 min,
      from 10% to 70% by weight of a first polypropylene homopolymer having a melt flow index at 230° C.-2.16 kg ranging from 2 to 6 g/10 min, and
      from 0.5% to 60% by weight of a master mixture comprising a stiffening agent which comprises from 30% to 60% of calcium carbonate and micronized talc, and from 70% to 40% by weight of second polypropylene homopolymer,
   wherein said structure comprises an additional layer (C), thermowelded to an outer layer (B) of the two flat outer films, and
   wherein the additional layer (C) consists of a continuous filament fiber network or technical fabric that is in contact with the outer layer (B) of the flat outer films.

2. The honeycomb sandwich panel according to claim 1, wherein said network or technical fabric comprises polyethylene terephthalate (PET), polypropylene, polyamide, glass fiber or other polyolefin, or a mixture thereof.

3. The honeycomb sandwich panel according to claim 1, further comprising an aesthetic finishing fabric coupled to the additional layer (C) to form a pre-coupled structure.

4. The honeycomb sandwich panel according to claim 3, wherein the aesthetic finishing fabric is needled, TNT, or dilour.

5. The honeycomb sandwich panel according to claim 1, wherein the thermoplastic polypropylene has talc, glass fiber, and/or polyamide admixed therein.

6. The honeycomb sandwich panel according to claim 1, wherein said honeycomb sandwich panel has the following structure:
the additional layer C thermowelded to the outer layer (B) of one of the flat outer films;
the upper flat outer film (BA), which is adjoined to the coextruded central film (ABA), which is adjoined to the lower flat outer film (AB); and
a second additional layer C, which is thermowelded to the outer layer (B) of the bottom outer film.

7. The honeycomb sandwich panel according to claim 1, wherein the layers of the outer film and of the central film have a same composition.

8. The honeycomb sandwich panel according to claim 1, wherein the layers of the outer film and of the central film have a different composition.

9. A method of use of a honeycomb sandwich panel, comprising:
providing a honeycomb sandwich panel comprising:
a structure having two flat outer films, thermowelded to a central film consisting of a thermoformed blister film, with blisters repeated in a regular and continuous pattern, each of said flat outer films consisting of a coextruded two-layer film (AB) made from thermoplastic polypropylene,
wherein an inner layer (A) of the two-layer film faces the central thermoformed blister film and the central thermoformed blister film is a coextruded three-layer film (ABA) made from thermoplastic polypropylene and an outer layer (B) of the two-layer film faces outwardly,
wherein at least one of said upper flat outer film (BA) and a lower flat outer film (AB) has the inner layer extruded from an extrusion mixture comprising,
from 0.00% to 100% by weight of a polypropylene binder having a melt flow index at 230°-2.16 kg ranging from 3 to 6 g/10 min,
from 100% to 0% by weight of a first polypropylene copolymer having a melt flow index at 230° C.-2.16 kg ranging from 3 to 8 g/10 min, in a quantity equal to a difference between 100% and a quantity of the polypropylene binder, and the outer layer extruded from an extrusion mixture comprising,
from 0.5% to 50% by weight of a second polypropylene copolymer having a melt flow index at 230° C.-2.16 kg ranging from 3 to 8 g/10 min,
from 10% to 70% by weight of a first polypropylene homopolymer having a melt flow index at 230° C.-2.16 kg ranging from 2 to 6 g/10 min, and
from 0.5% to 60% by weight of a master mixture comprising a stiffening agent which comprises from 30% to 60% of calcium carbonate and micronized talc, and from 70% to 40% by weight of second polypropylene homopolymer,
wherein two outer layers (A) of the coextruded three-layer film (ABA) each face one of the flat outer films and an inner layer (B) of the coextruded three-layer film (ABA) is disposed therebetween,
wherein the two outer layers of the coextruded three-layer film (ABA) are extruded from an extrusion mixture comprising,
from 0.00% to 100% by weight of a polypropylene binder having a melt flow index at 230°-2.16 kg ranging from 3 to 6 g/10 min,
from 100% and 0% by weight of a first polypropylene copolymer having a melt flow index at 230° C.-2.16 kg ranging from 3 to 8 g/10 min, in the quantity equal to the difference between 100% and the quantity of the polypropylene binder,
and the inner layer of the coextruded three-layer film (ABA) is extruded from an extrusion mixture comprising,
from 0.5% to 50% by weight of a second polypropylene copolymer having a melt flow index at 230° C.-2.16 kg ranging from 3 to 8 g/10 min,
from 10% to 70% by weight of a first polypropylene homopolymer having a melt flow index at 230° C.-2.16 kg ranging from 2 to 6 g/10 min, and
from 0.5% to 60% by weight of a master mixture comprising a stiffening agent which comprises from 30% to 60% of calcium carbonate and micronized talc, and from 70% to 40% by weight of second polypropylene homopolymer,
wherein said structure comprises an additional layer (C), thermowelded to an outer layer (B) of the two flat outer films, and
wherein the additional layer (C) consists of a continuous filament fiber network or technical fabric that is in contact with the outer layer (B) of the flat outer films; and
installing the honeycomb panel as a structural panel in a building, as an aesthetic panel in furniture, or as an automotive interior panel.

10. The method according to claim 9, wherein the honeycomb panel is installed as a structural panel in a building, and wherein the continuous filament network or technical fabric comprises polyethylene terephthalate (PET), polypropylene, polyamide, glass fiber, or other polyolefin, or a mixture thereof.

11. The method according to claim 9, wherein the honeycomb panel is installed as an aesthetic panel in furniture or as an automotive interior panel, wherein the additional layer (C) has a pre-coupled structure consisting of the continuous filament network or technical fabric made from polyethylene terephthalate (PET), polypropylene, or a polyamide or glass fiber, and an aesthetic finishing fabric which is needled, TNT, or dilour.

12. A process of producing a honeycomb sandwich panel according to claim 1, comprising:
coextruding two flat outer films (AB) each having an inner layer (A) and an outer layer (B), wherein said inner layer (A) comprises,
from 0.00% to 100% by weight of a polypropylene binder having a melt flow index at 230°-2.16 kg ranging from 3 to 6 g/10 min,
from 100% to 0% by weight of a first polypropylene copolymer having a melt flow index at 230° C.-2.16 kg ranging from 3 to 8 g/10 min, in a quantity equal to a difference between 100% and a quantity of the polypropylene binder, and said outer layer comprises,
from 0.5% to 50% by weight of a second polypropylene copolymer having a melt flow index at 230° C.-2.16 kg ranging from 3 to 8 g/10 min,
from 10% to 70% by weight of a first polypropylene homopolymer having a melt flow index at 230° C.-2.16 kg ranging from 2 to 6 g/10 min, and from 0.5% to 60% by weight of a master mixture comprising a stiffening agent which comprises from 30% to 60% of calcium carbonate and micronized talc, and from 70% to 40% by weight of second polypropylene homopolymer;

coextruding a three-layer film (ABA) having two outer layers (A) and an inner layer (B) disposed therebetween, wherein the two outer layers of the three-layer film (ABA) comprise, from 0.00% to 100% by weight of a polypropylene binder having a melt flow index at 230°-2.16 kg ranging from 3 to 6 g/10 min, and from 100% to 0% by weight of a first polypropylene copolymer having a melt flow index at 230° C.-2.16 kg ranging from 3 to 8 g/10 min, in the quantity equal to the difference between 100% and the quantity of the polypropylene binder, and the inner layer of the three-layer film (ABA) comprises, from 0.5% to 50% by weight of a second polypropylene copolymer having a melt flow index at 230° C.-2.16 kg ranging from 3 to 8 g/10 min, from 10% to 70% by weight of a first polypropylene homopolymer having a melt flow index at 230° C.-2.16 kg ranging from 2 to 6 g/10 min, and from 0.5% to 60% by weight of a master mixture comprising a stiffening agent which comprises from 30% to 60% of calcium carbonate and micronized talc, and from 70% to 40% by weight of second polypropylene homopolymer, and wherein said two flat outer films are coextruded on opposite sides of said three-layer film (ABA);

thermowelding said two flat outer layers consisting to thr three-layer film (ABA); and thermowelding, on the outer layer (B) of the two-layer films, an additional layer (C), consisting of a continuous filament network or technical fabric comprising polyethylene terephthalate (PET), polypropylene, polyamide, fiber glass or other polyolefin, and/or a mixture thereof, said thermowelding of the additional layer being performed during the step of coextruding the two flat outer films.

13. The process according to claim 12, further comprising an aesthetic finishing fabric, which is needled, TNT, or dilour and which is coupled to the additional layer (C).

* * * * *